INVENTOR.
JOHN T. FISHER.
BY
ATTORNEY.

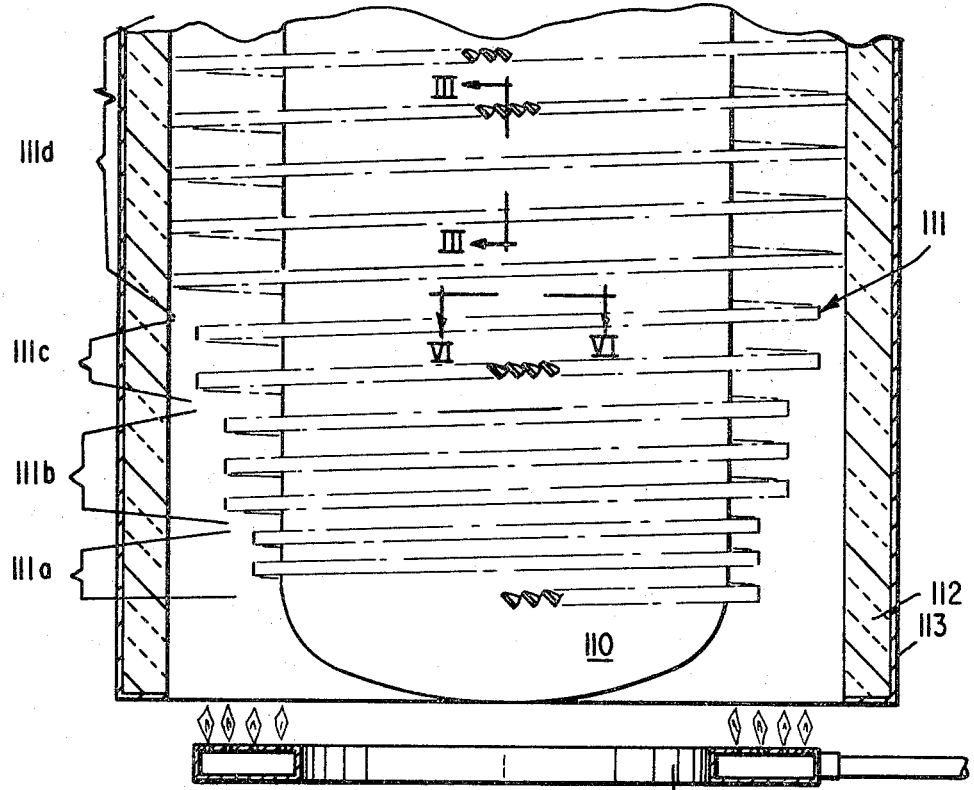
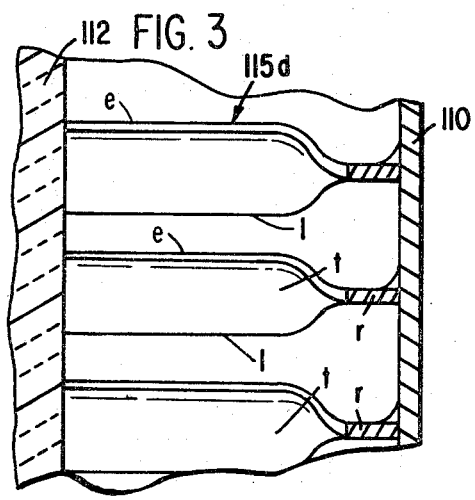
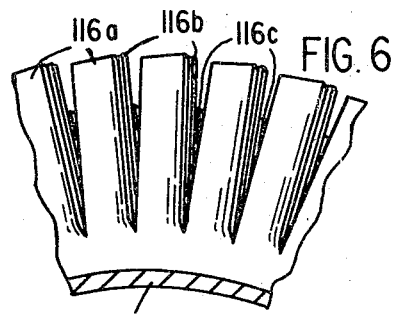
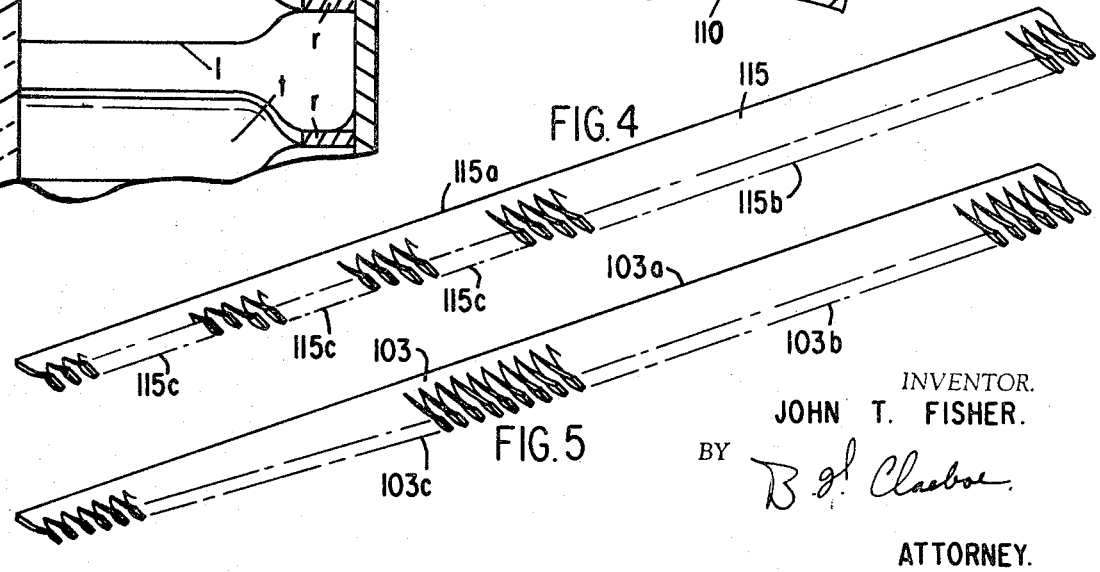

United States Patent Office 3,520,282
Patented July 14, 1970

---

3,520,282
REFRIGERATION GENERATOR CONSTRUCTION
John T. Fisher, Indianapolis, Ind., assignor to Carrier Corporation, Syracuse, N.Y., a corporation of Delaware
Filed July 1, 1968, Ser. No. 741,697
Int. Cl. F22b 37/06; F28f 13/14
U.S. Cl. 122—367                      3 Claims

ABSTRACT OF THE DISCLOSURE

A refrigeration system comprised of a generator, solution-cooled absorber, primary absorber, condenser, liquid-suction heat exchanger, and chiller, the generator having integrally associated therewith a plurality of axially spaced heat transfer surfaces of lesser radial extent adjacent the bottom of the generator than proximate the top thereof.

BACKGROUND OF THE INVENTION

It is known in the art to provide on a generator shell a heat exchange member having circumferentially spaced and radially extending fins which provide the desired heat exchange surfaces. The surfaces so constructed abut throughout their axial extent the cylindrical insulating member which surrounds the generator shell, and as a consequence, excessive fin tip temperatures develop in the relatively hot lower end of the combustion zone. Further, in this construction, it is relatively impossible to achieve the desired gas turbulence upwardly therethrough, and the same general structure leaves much to be desired by way of effective heat transfer.

The present invention relates to a gas air conditioning system having a generator as one portion thereof and featuring a spirally wound heat exchange member in the combustion zone welded or otherwise secured to the generator shell. The heat exchange member when so positioned is characterized by a plurality of axially spaced heat transfer surfaces which are of lesser radial extent in the region of the lower end of the combustion zone than adjacent the upper or exit end thereof. By so constructing the heat exchanger in integral association with the generator, there is avoided the prior art problems of excessive fin tip temperature and an undesirably high heat input to the absorption liquid, which tends to cause degradation thereof. As a result, the fluid temperatures within the generator are equalized and its upper portion provides more effective heat transfer, producing a generator of greater efficiency which is capable of being constructed with smaller dimensions than has previously been the case.

SUMMARY OF THE INVENTION

The instant invention is particularly directed to an absorption refrigeration generator for use as an important part of a refrigeration system, the generator having secured to its outer shell a spirally wound heat exchange member preferably formed of sheet metal in band or strip form which, when having been assembled with the shell, displays a lesser radial dimension in the lower region of the combustion zone than along the upper portion thereof. The heat exchange member so constructed has axially spaced heat exchange surfaces, and when viewed in bottom plan, these surfaces are essentially aligned and yet staggered. The heat exchange surfaces may present a twisted configuration when viewed in side elevation, although this is not an absolute requirement. As has been stated, by contouring the heat exchange member, which may present either a stepped or tapered configuration, there is produced adjacent the fin tips lower temperatures in the relatively hot region of the combustion zone, fluid temperatures within the generator are generally equalized, hot spots interiorly of the generator are substantially eliminated, and there is provided a significant amount of additional cubical area for more efficient combustion.

BRIEF DESCRIPTION OF THE DRAWINGS

FIG. 2 is a view in elevation of another generator construction including the novel concepts of the present invention;

FIG. 3 is a vertical sectional view taken substantially along the line III—III of FIG. 2;

FIGS. 4 and 5 are perspective views of exemplary configurations of fin structures constructed in accordance with this invention; and FIG. 6 is a fragmentary sectional view taken substantially along the line VI—VI of FIG. 2.

DESCRIPTION OF THE PREFERRED EMBODIMENT

Figure 1:
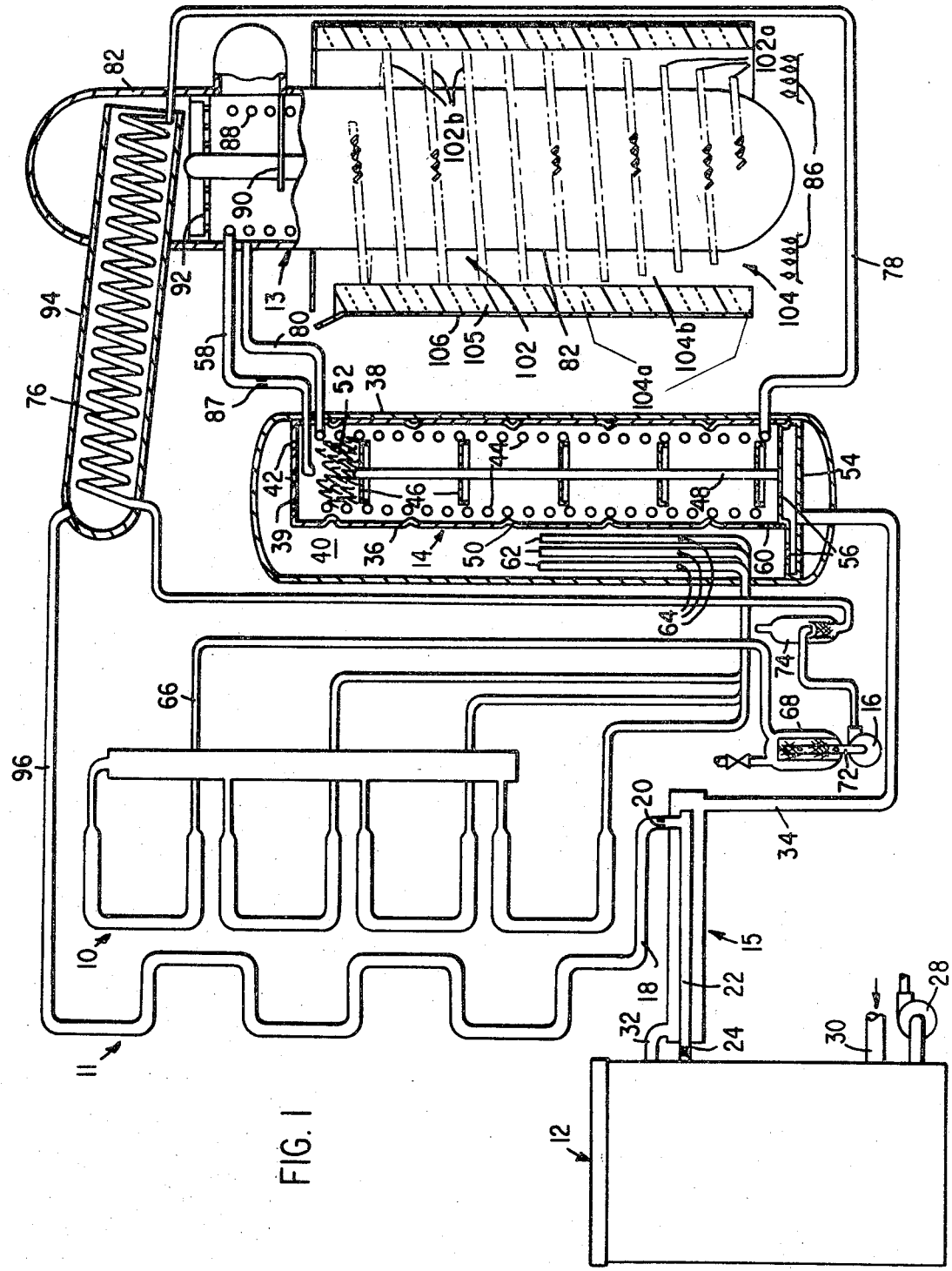
FIG. 1 illustrates schematically, and with portions thereof taken in section, a preferred form of air conditioning system embodying this invention.

Referring now to the drawings, there is shown in FIG. 1 a refrigeration system comprising a primary absorber 10, a condenser 11, an evaporator or chiller 12, a generator 13, which as illustrated constitutes one embodiment of the present invention, a solution-cooled absorber 14 and a liquid-suction heat exchanger 15 connected to provide a refrigeration cycle. A pump 16 is employed to circulate weak absorbent solution from the primary absorber 10 to the generator 13.

As used herein, the term "weak absorbent solution" refers to a solution which is weak in absorbent power and the expression "strong absorbent solution" refers to a solution which is strong in absorbent power. A suitable absorbent for use in the system described is water and a suitable refrigerant is ammonia.

Liquid refrigerant condensed in the condenser 11 passes through refrigerant liquid passage 18, and refrigerant restriction 20 to heat exchange tube 22 of the liquid-suction heat exchanger 15. The liquid refrigerant is cooled in the tube 22 and emerges from the liquid-suction heat exchanger and passes through refrigerant restriction 24 into a heat exchanger (not shown) in the chiller 12.

A fluid medium such as water to be chilled passes over the exterior of the heat exchanger within the chiller 12, where it is chilled by giving up heat to evaporate refrigerant within the heat exchanger. The chilled medium passes out of the chiller 12 through line 28 to suitable remotely located heat exchangers (not shown), after which it is returned to the chiller through inlet 30 for rechilling.

The cold refrigerant evaporated in the heat exchanger within the chiller or evaporator 12 passes through refrigerant vapor passage 32 and through the liquid-suction heat exchanger 15 in heat exchange relation with liquid refrigerant passing through the tube 22. The refrigerant vapor then passes through refrigerant vapor passage 34 into the solution-cooled absorber 14.

The solution-cooled absorber 14 is formed within a tubular or cylindrical vessel 38 by a tubular, preferably cylindrical, internal baffle 36 which divides the tubular cylindrical vessel 38 into the solution-cooled absorber 14 and a second solution chamber 40. The vessel 38 is preferably closed at opposite ends. The baffle 36 may be provided with a top cover plate 39 having a plurality of vapor discharge apertures 42 therein to allow vapor to escape from the solution-cooled absorber 14 into the chamber 40.

A weak solution heat exchanger 44 preferably comprising a helical coil is disposed within solution-cooled absorber 14. A plurality of horizontally extending plates 46 are secured to a central support 48 and arranged interiorly of the baffle 36 to cooperate with annular grooves 50 and the heat exchanger 44 to provide a tortuous continual flow or passage for vapor and solution through the solution-cooled absorber 14. Suitable packing means, such as Raschig rings 52, may fill the space between the uppermost plate 46 and the top of solution-cooled absorber to reduce the tendency for solution froth to escape through the discharge apertures 42.

A refrigerant vapor distributor header 54 is secured to close the bottom of the baffle 36. The header 54 is provided with refrigerant vapor ports 56 for passage of refrigerant vapor from the line 34 into the solution-cooled absorber 14 and the chamber 40. Strong solution from the generator 13 is admitted to the top portion of the solution-cooled absorber 14 through line 58. The strong solution passes downwardly through the solution-cooled absorber in counter-flow relation with upwardly passing refrigerant vapor and weak solution passing through the coil 44. A strong solution discharge passage 60 is provided adjacent the lower portion of the baffle 36 for passage of solution from the solution-cooled absorber into the chamber 40.

Solution discharge passages 62 are provided for passing a mixture of refrigerant vapor and solution from the chamber 40 to the primary absorber 10. Each of the discharge passages comprises a tubular member, an open upper end for admission of vapor and a solution inlet aperture 64 disposed below the level of absorbent solution in the chamber 40. This insures a mixed flow of liquid and vapor to the primary absorber.

A cooling medium, preferably ambient air, is passed through the primary absorber 10 in heat exchange relation with the absorbent solution to cool the absorbent solution and promote the absorption of the refrigerant vapor in the absorber. The same cooling medium may be supplied to the condenser 11 in heat exchange relation with refrigerant therein to condense the refrigerant.

Cold weak absorbent solution passes from the primary absorber 10 through line 66 into pump inlet tank 68. Weak solution from the inlet tank 68 is supplied to weak solution pump 16 through line 72. Liquid from pump 16 passes through pump discharge tank 74 to a rectifier heat exchange coil 76. From the coil 76 the weak solution passes through line 78 to the weak solution heat exchanger 44 in the solution-cooled absorber 14. The weak solution from the coil 44 passes through line 80 into the upper portion of the generator 13 along with any vapor formed in the coil 44.

The generator 13 comprises a shell 82 having a novel fin arrangement secured thereto, said arrangement to be later described in detail. The generator is heated by a gas burner 86 or any other desired heating means. The weak solution is boiled in the generator 13 to form a strong solution and refrigerant vapor.

The hot strong absorbent solution passes upwardly through the analyzer section of the generator 13 through analyzer coil 88 in heat exchange relationship with the weak solution passing downwardly over the coil. The warm strong solution then passes through the line 58 which has a solution restrictor 87, and is then discharged into the upper portion of the solution-cooled absorber 14.

Refrigerant vapor formed in the generator 13 passes upwardly through the analyzer section thereof where it is concentrated by mass transfer with weak solution passing downwardly over the analyzer coil 88. Analyzer plates 90 in the generator 13 provide a tortuous path for flow of solution and vapor to assure intimate contact therebetween to improve the mass transfer. The refrigerant vapor from the analyzer section passes through reflux plate 92 in heat exchange relation with absorbent condensed in rectifier 94. The vapor then passes through the rectifier 94 in heat exchange relation with the rectifier heat exchange coil 76. Absorbent condensed in the rectifier 94 flows downwardly onto the plate 92 where it is heated by the refirgerant vapor passing therethrough. The heated absorbent is then passed to the generator along with the weak solution discharged into the generator from line 80. Vapor passes through line 96 to the condenser 11 to complete the refrigeration cycle.

One of the many significant contributions made by the present invention is the provision of a generator fin construction which substantially reduces the fin tip temperature in the lower hotter region of the combustion zone, equalizes the fluid temperature interiorly of the generator, whereby the upper portion thereof transfers a greater amount of heat and its efficiency is accordingly higher, hot spots within the generator are essentially eliminated, and since the flue gases can bypass the fins, there is provided additional space for combustion, as well as achieving more efficient combustion in a relatively smaller space.

One embodiment of the invention which features the above characteristics appears in FIG. 1 and is more particularly illustrated in the fragmentary view of FIG. 5. As is shown therein, a heat exchange member 102 is spirally arranged upon the outer diameter of the generator shell or casing 82 and is preferably provided by a continuous sheet metal strip or band 103 having a relatively straight marginal portion 103a and an opposed tapered marginal portion 103b suitably formed along its length with a plurality of teeth or fins 103c having a slight degree of twist therein, exemplified by about a one-fourth turn from the horizontal, as is best seen in FIG. 3.

Importantly, by provision of a heat exchange member 102 having a tapered or sloping edge 103b, the strip 103, when affixed to the generator shell 82, as by continuous welding techniques, produces in lower end 104a of combustion zone 104 a space 104b between the lower turns of the spirally wound or coiled heat exchange member and the inner diameter of insulation sleeve 105 which is wrapped by a metal shell 106. The lowermost turns of the heat exchange member 102 are designated in FIG. 1 by the numeral 102a, and it may be seen from this same view that uppermost turns 102b preferably abut or at least are in immediate proximity to the inner wall of the insulation sleeve 105.

It is to be noted with respect to the embodiment of the invention illustrated particularly in FIGS. 1 and 5, as well as in the structure of FIGS. 2 and 4, later to be described, which desirably incorporates a fin arrangement having a slight individual twist or turn therein, that provision of a variable dimension gap or space 104b between the heat exchange surfaces or fins 102a and the inner wall of the insulation sleeve 105, which gap diminishes in its extent as the flue gases move upwardly in the combustion zone 104, achieves a number of advantageous results. First, spacing the lower runs or turns 102a from the inner diameter of the insulation sleeve 105 promotes the more effective creation of eddy currents in this region without interference with the desired normal turbulence thereabove. Second, the gap provided by the structures embodied by this invention has been found to cause the fin tip temperature to be maintained at not substantially above 900° F. Third, and closely related to the use of fins having a slight twist thereon, significant improvements in the heat transfer properties of the fins have been noted. To explain, a tapered or stepped fin structure, wherein the individual fins are twisted, results in an upflow of flue gases of generally spiral configuration by reason of deflection of said gases off the fin tips, in contrast to impingement of the gases against a flat fin surface with consequent poor heat transfer and a lesser degree of turbulence than desired.

A representative fin structure embodying the novel concepts of this invention is portrayed in FIG. 3 as being an integral part of the stepped fin arrangement of FIG. 2, although it will be appreciated that it is equally applicable to the tapered fin configuration of FIG. 1, and to such other variations in heat exchangers coming within the purview of this invention. Referring now first to FIGS. 2 and 4, a generator 110 has welded or otherwise secured to the shell or casing thereof a heat exchange member of stepped configuration generally designated at 111 and as illustrated, may be constructed to include four banks 111a–d, although obviously this may be varied as well as the number of rows in each bank. Like the embodiment of FIG. 1, the generator 110 is surrounded by a generally cylindrical insulation shell 112 wrapped by a metal sleeve 113. Heat is supplied to the generator in the conventional manner by a substantially annular gas burner 114.

The heat exchange member 111 is preferably constructed from a metal band or strip essentially in the form shown in FIG. 4. Band 115 is provided with a relatively straight marginal portion 115a and an opposed discontinuous marginal portion 115b which, in the fragmentary perspective view of this figure, includes a plurality of indented sections 115c provided with teeth or fin elements 115d, whereby when the band 115 is continuously welded or otherwise secured to the generator shell 110 in wrapping relation therewith, the heat exchanger 111 assumes the form or configuration shown in FIG. 2. By reason of so disposing the fins of the heat exchange member, excessive fin tip temperatures are avoided and the other earlier noted advantages of the invention are achieved.

It is an important aspect of this invention that in the fin structures illustrated, and in any variations thereto, the heat exchange member presents when viewed in plan a staggered configuration. This has been found by investigation to promote more effective turbulence of the flue gases and produces improved heat transfer, particularly when combined with fins which are twisted or canted. A portrayal of an exemplary arrangement appears in FIG. 6 wherein fins 116a and 116b of bank 111c are substantially vertically aligned, and yet are vertically staggered with respect to fins 116c of the next bank 111b.

The twisted or canted configuration of the fins is illustrated in the sectional view of FIG. 3, and the same novel contouring is employed with the heat exchange members or fins 103c. Each fin 115d is formed to provide a base or root segment $r$ integral with a tooth portion $t$ having in the view of FIG. 3 a leading edge $l$ which sweeps by reason of the twist or cant into a trailing edge $e$. The root $r$ of each fin is welded to the shell or casing of the generator 110, and the teeth $t$ in the vertical section as taken abut or contact the insulation sleeve 112.

The present invention has been shown in two embodiments, and variations thereto have been discussed. Other modifications can of course be effected without departing from the spirit of the invention or the scope of the subjoined claims.

I claim:

1. A vapor generator comprising:
   a vertical cylindrical vessel adapted to receive the liquid to be vaporized,
   combustion means disposed beneath said vessel for heating the liquid therein,
   tubular housing means spaced from said vessel to define a passage for the products of combustion between said vessel and said housing means, and
   fin means formed by a metal band spirally wrapped and being secured to said vessel projecting into the space between said vessel and said housing means for transferring heat from the products of combustion to the wall of said vessel, the length of said fin means increasing in proportion to the distance from said burner to prevent excess heat transmission near the lower part of said vessel where the products of combustion are the hottest and to provide maximum heat transmission near the top of said vessel where the products of combustion are coolest, thereby minimizing temperature variations within the vessel from the bottom to the top thereof.

2. A vapor generator according to claim 1 wherein the length of the fin means increases in steps in a direction away from said combustion means.

3. A vapor generator according to claim 1 in which said metal band is formed to provide a plurality of radially outwardly extending fins, each of which has a twist therein.

References Cited

UNITED STATES PATENTS

| 1,851,851 | 3/1932  | Lee et al. | 122—166   |
| 2,225,606 | 12/1940 | Beauvais.  |           |
| 2,372,795 | 4/1945  | Rodeck     | 165—184 X |
| 2,667,337 | 1/1954  | Chapman    | 165—184   |
| 3,407,625 | 10/1968 | McDonald   | 62—497 X  |

WILLIAM E. WAYNER, Primary Examiner

U.S. Cl. X.R.

62—497; 165—146